United States Patent Office 3,282,027
Patented Nov. 1, 1966

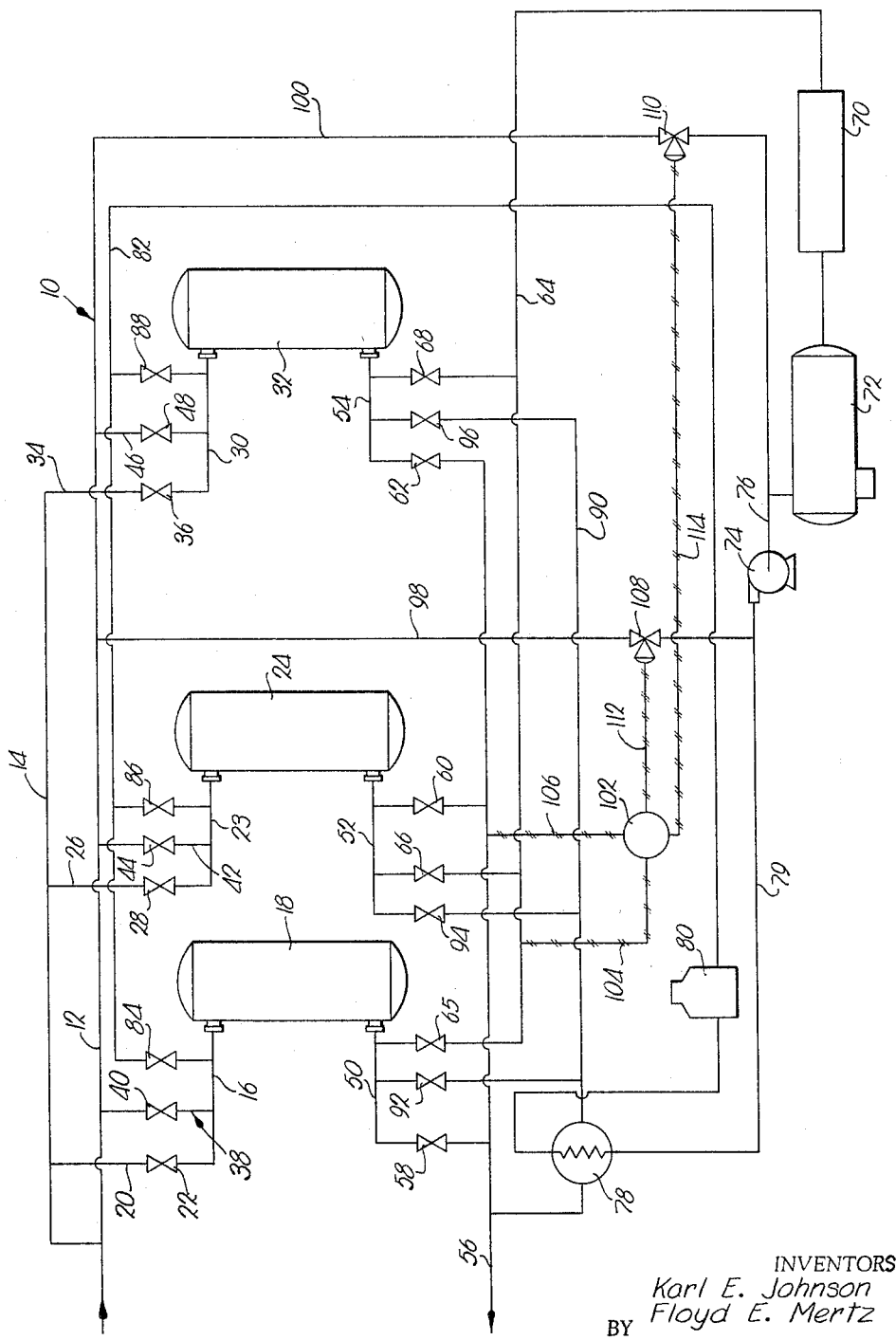

3,282,027
PRESSURE DIFFERENTIAL CONTROL APPARATUS AND A METHOD FOR ADSORPTION
Karl E. Johnson and Floyd E. Mertz, Prairie Village, Kans., assignors to J. F. Pritchard and Company, Kansas City, Mo., a corporation of Missouri
Filed June 2, 1965, Ser. No. 460,653
6 Claims. (Cl. 55—21)

This invention relates to adsorption apparatus and a method for treating gas streams and particularly to novel structure for eliminating the possibility of any leakage of untreated gas into the treated, dry gas stream.

Adsorption systems have been used for many years to remove components such as water and hydrocarbons from a gas stream in the nature of natural gas, with the feed gas stream, commonly referred to as wet gas, being passed through a regenerated adsorbent bed to effect removal of certain components, even in vapor form, from the gas. In order to permit removal of components from the gas on a continuous basis, it is conventional procedure to employ a number of beds of adsorbent material operated in cyclic relationship. Thus, after loading one adsorbent bed with adsorbed components this adsorber is then placed on a regeneration cycle wherein a hot fluid is directed through the adsorbent material to displace the adsorbed components therefrom. The regenerate fluid containing the now desorbed components is then directed through suitable condensing structure where the desorbed components are condensed and removed, and the regenerate then returned to a suitable source of heat for raising the temperature thereof to the required regeneration level. In order to obtain most efficient utilization of the adsorbent beds, it has been found desirable to pass a relatively cool gas through the freshly regenerated adsorbent bed, in order to lower the temperature thereof as rapidly as possible, so that the bed may be placed back on a full adsorbing cycle. It has been found economical to divert a portion of the main wet gas stream through the freshly regenerated adsorbent bed to cool the bed down to the temperature of the gas stream at the inlet side of the bed.

In order to keep the cost of the equipment at a minimum, cycling of the adsorbent beds is carried out by means of fixed conduit installations coupled with the several adsorbent beds and provided with suitable valving structure for cycling the various gas streams through the beds as required. It is conventional to utilize valves of the butterfly or similar type for diverting the gas streams from one bed to another. While the relatively low cost and other characteristics of valves of this type make them particularly well suited for use in gas treating installations, they are prone to permit a certain amount of leakage past the valves when closed.

Although a certain amount of leakage through some of the valves in the installation can be tolerated, it is particularly important that there not be any leakage of the regeneration fluid into the dry gas output because of the presence of liquids in the regeneration fluid which have been picked up from the loaded adsorbent beds.

Accordingly, it is the primary object of this invention to provide apparatus capable of eliminating leakage of the regeneration fluid into the dry gas stream in stallations of this type so that contaminating liquids are not admitted into the treated gas stream.

Another object of the invention is to provide apparatus for maintaining the pressure of the regeneration fluid at a predetermined amount below the pressure of the dry gas stream at locations where the regeneration circuit is separated from the dry gas stream by valves so that any leakage through the valves is in a direction toward the regeneration fluid.

A further object of the invention is to provide automatically operable apparatus for maintaining such pressure differential in order to obviate the necessity for operator attention.

These and other objects of the instant invention will be more fully explained or will become apparent from the following specification and appended claims.

In the drawing, the single figure is a schematic representation of equipment suitable for removing water and hydrocarbons from a wet natural gas stream by an adsorption process.

For purposes of the present disclosure, three adsorbent vessels have been shown in the apparatus but it is to be understood that two or more of these adsorption units may be employed, depending upon the gas capacity required and the size of equipment which can be accommodated in the available space. Three adsorption units have been shown for depicting one bed operating in the adsorbing cycle, another bed being operably coupled in the regeneration cycle, and a third bed operably coupled in the cooling cycle.

In the representative apparatus broadly designated 10 in the drawing a main wet gas line 12 is connected to a header conduit 14 which in turn is connected with a manifold 16 of an adsorber bed 18 by a line 20 containing a valve 22. Similarly, conduit 14 is connected to a manifold 23 of a second adsorber bed 24 by a line 26 having a valve 28 while manifold 30 of a third adsorber bed 32 is connected to conduit 14 by line 34 through valve 36. Manifold 16 is connected with the main wet gas line 12 by a line 38 through a valve 40 while a line 42 interconnects line 12 and manifold 23 through a valve 44 and a line 46 runs from manifold 30 to line 12 through valve 48.

Each of the adsorber beds 18, 24 and 32 are provided with outlet manifolds 50, 52 and 54 respectively. Each outlet manifold is coupled with the main dry gas line 56 through valves 58, 60 and 62 respectively.

The regeneration circuit for apparatus 10 includes a conduit 64 coupled to each of the beds 18, 14 and 32 through valves 65, 66 and 68 respectively and conduit 64 is coupled with the input side of a condenser 70 for cooling the regeneration fluid to a level to condense the components in the fluid and which have been displaced from the adsorbent vessels. A separator 72 in the regeneration line downstream from condenser 70 is provided for removing the liquids from the regeneration fluid and is, in turn, coupled with the input side of a fluid pump 74 by a line 76. The output from pump 74 is carried by a line 79 through a heat exchanger 78 and to a heater 80 wherein the temperature of the regeneration fluid is elevated to a selected level. The heated regeneration fluid from heater 80 is conducted into a header 82 which, in turn, communicates with manifolds 16, 23 and 30 through valves 84, 86 and 88 respectively.

A line 90 for conducting the gas used in the cooling cycle from the hot adsorption beds to the main dry gas line 56 passes through heat exchanger 78 where the heat therefrom is used to elevate the temperature of the regeneration fluid and line 90 is coupled to the manifolds 50, 52 and 54 through valves 92, 94 and 96 respectively.

All of the structure described to this point in the specification is entirely conventional. However, it has been found that particularly beneficial results can be obtained in the utilization of adsorption apparatus of the type described by the provision of a novel fluid line 98 interconnecting the regeneration line downstream of pump 74 and the main wet gas line 12. A second fluid line 100 interconnects the regeneration line upstream of pump 74 with the main wet gas line 12. This novel subject matter of the present invention includes pressure sensing structure 102 which may be identified as either a diaphragm or bellows type differential pressure transmitter of conventional design per se. Structure 102 is in fluid communication with the conduit 64 through the medium of line 104 and with the main dry gas stream in line 56 through line 106. Variable orifice flow control valves 108 and 110 are interposed in lines 98 and 100 respectively and are operably connected to fluid conduits 112 and 114 respectively extending from the differential pressure control structure 102. Although the components of structure 102 and valves 108 and 110 are primarily adapted for pneumatic operation, is is to be recognized that electrically or mechanically operable units are utilizable with equal facility for the present application. Structure 102 opens and closes the valve elements in valves 108 and 110 in response to pressure differential sensing made by structure 102. Valves 108 and 110 are normally closed and are opened when the pressure differential between conduit 64 and line 56 deviates from certain preselected limits as will be subsequently explained.

In describing the operation of apparatus 10, it is apparent that for a basic understanding of the principles of the present invention, it is only necessary that one cycle of operation of the equipment components be considered. Assuming the valve 40 is open and valves 44 and 48 are closed, it can be seen that the wet gas stream flowing in line 12 is directed into adsorber 18. The adsorption medium in adsorber 18 removes components from the natural gas, whereby the dry gas leaving the lower extremities of vessel 18 is introduced into the main dry line 56 through manifold 50 and valve 58. Simultaneously with the drying of the main gas stream flowing through adsorber vessel 18, a predetermined portion of the wet gas from line 12 is diverted therefrom by a conduit 14 and introduced into the upper extremity of adsorber vessel 24. It is assumed that the adsorbent material in vessel 24 has just undergone regeneration and therefore, is in a hot condition. The gas stream diverted from line 12 is introduced into the adsorber vessel 24 to cool the adsorbent material therein, with the gas emanating from the lower extremity of vessel 24 being admitted to line 90 through manifold 52 and valve 94 where the hot gas passes through heat exchanger 78 and is discharged into the main dry gas line 56.

At this same time, the adsorbent material in vessel 32, which has previously been loaded with adsorbed components during a loading stage, is regenerated by a gas flowing through header 82 from heater 80 through valve 88. Thus, the heated gas flowing from heater 80 is directed into the adsorber vessel 32 to heat the adsorbent material therein to a level to purge all components from the adsorbed material to thereby reactivate the bed for use in a subsequent adsorbing cycle. After picking up the components in vessel 32, the regeneration fluid is directed through valve 68 to conduit 64 where the fluid passes through the condenser 70 and separator 72 for removing the components from the gas stream so that the latter may be reused to desorb another loaded bed during cyclic operation of apparatus 10. A substantial pressure drop occurs in the regeneration circuit as the gas is passed through the condenser 70 and separator 72, and pump 74 is utilized for elevating the pressure to effect circulation of the regenerating fluid. It will be readily understood by those skilled in the art that, with the structure illustrated schematically in the drawing, each of the adsorbing beds 18, 24 and 32 respectively can be cyclically switched through the adsorbing, regenerating and cooling cycles merely through operation of the appropriate valves.

Conduit 64 of the regeneration circuit which carries the regeneration fluid charged with components picked up from the adsorbing agent in bed 32 is separated from the dry gas stream by valves 65, 66, 96 and 62 when apparatus 10 is operating in the cycle described. If any leakage occurs at either of these valves, there is a likelihood that components from the fluid will be discharged into the dry gas stream resulting in pollution thereof. If the pressure in conduit 64 is maintained at a predetermined amount below the pressure in the main dry gas stream, any tendency of leakage at valves 62, 65, 66 and 96 will be in a direction toward conduit 64, thereby preventing any escape of components from the regeneration fluid into the dry gas stream.

Thus structure 102 senses the pressure in both the regeneration fluid conduit 64 and the main dry gas stream 56. When the pressure of the fluid in conduit 64 is greater than a preselected amount below the pressure in line 56, structure 102 operates to open valve 108 to permit fluid from line 79 to be bled through line 98 from the regeneration fluid circuit and into the main wet gas line 12. When the pressure in the regeneration circuit returns to a valve which is the preselected differential between the value of the pressure in conduit 64 and line 56, valve 108 is returned to its normally closed position. If, on the other hand, the pressure of the fluid in the regeneration circuit falls to a value wherein the differential pressure between line 56 and conduit 64 is greater than the preselected amount, structure 102 operates to open valve 110 permitting gas from the main wet gas line 12 to be introduced into the regeneration circuit upstream from pump 74. When the preselected pressure differential is reestablished, valve 110 returns to its closed position.

As an example only, assuming that the apparatus 10 is operating with a pressure of six hundred p.s.i.g. in the main wet gas line 12 and 590 p.s.i.g. in the main dry gas line 56, it might be desirable to keep the pressure in conduit 64 at 586 p.s.i.g. so that there will be no tendency for the regeneration fluid to escape to the dry gas stream. Structure 102 is set to operate valves 108 or 110 individually if the difference in pressure between the gas in line 56 and conduit 64 exceeds or falls below approximately four p.s.i. The pressure of the regeneration fluid immediately down-stream from pump 76 is well above 600 p.s.i.g. so gas readily flows through line 98 in the direction of line 12 when valve 108 is opened by structure 102 which occurs whenever the pressure differential between conduit 64 and line 56 falls below four p.s.i. The bleeding of gas from the regeneration circuit continues until the four p.s.i. pressure differential is again established at which time structure 102 operates to permit valve 108 to return to its normal closed position stabilizing the gas pressure in the regeneration circuit. Similarly, the pressure of the regeneration fluid immediately upstream from pump 74 is sufficiently below 600 p.s.i.g. to permit the flow of wet gas through line 108 when valve 110 is open by the sensing of structure 102 of a pressure differential between conduit 64 and line 56 which exceeds four p.s.i.

The details of construction of structure 102 and valves 108 and 110 may be varied depending on the type of devices employed and, can, in fact, be combined in a single three-way valve. It can readily be seen that the novel structure of this invention serves, without the need for operator attention, to maintain a preselected pressure differential between the pressure in the regeneration circuit and the treated or dry gas stream at all times. Thus, any tendency for gas to leak across the valves of the system will be in a direction to insure that the component laden regeneration gas is not admitted into the dry gas stream. Such leakage is therefore rendered entirely harmless and does not cause pollution of the main dry gas stream. Leakage through valves in inlet manifolds 16, 22 and 30 is not important within the limits of performance of commercially available valves since all gases entering the adsorber on adsorbing duty will be processed. Therefore the differential pressure established between lines 56 and 64 can be maintained without regard to the differential pressures existing between lines 82 and 12.

Having thus described the invention, what is claimed as new and desired to be secured by Letters Patent is:

1. In adsorption apparatus for removing a component from a wet gas stream comprising a main wet gas line, a main dry gas line at least two units having an agent therein capable of removing said component from the gas, a regeneration system for heating a fluid regenerate for said agent, and conduit means operably coupled to said main gas lines, the units and said system for cyclically (a) directing a portion of the wet gas from said main wet gas line through a first unit and (b) directing the hot regenerating fluid from said system through a second unit containing a quantity of said agent which has previously been loaded with said component, said regenerating system including a conduit separated from the main dry gas line by a valve, and fluid pump means in the system for circulating said fluid, regenerate through the system, the combination with said apparatus of:

means for maintaining the pressure of said fluid regenerate in the conduit at a predetermined pressure below the pressure in said main dry gas line comprising, a first fluid line interconnecting said system downstream of the pump with the main wet gas line, a second fluid line interconnecting the system upstream of the pump with the main wet gas line, structure connected to said main dry gas line and said conduit for sensing the pressure differential therebetween, variable valve means in said first and second fluid lines respectively for individually varying the quantity of gas permitted to flow in each of said lines, and control means coupled to said structure and the variable valve means for varying the latter in response to variation of the pressure differential between the gas in said main dry gas line and the conduit to maintain a preselected pressure differential between the main dry gas line and the conduit to prevent leakage of regenerate fluid through said valve and into the main dry gas line.

2. Apparatus as set forth in claim 1 wherein said control means includes a differential pressure device operably coupled to said structure and to each of said valve means for individually altering the setting of said valve means in direct response to variations in the pressure difference between the gas in said main dry gas line and the conduit as sensed by said structure.

3. Apparatus as set forth in claim 2 wherein said structure includes a pressure operated differential transmitter operably coupled to said device for operating the latter.

4. Apparatus as set forth in claim 2 wherein said valve means are normally closed, the device being operable to open the valve means in the first fluid line to permit flow of gas from the system to the main wet gas line when the pressure differential between the main dry gas line and the conduit as sensed by the structure is below said predetermined amount and operable to open the valve means in the second fluid line to permit flow of gas from the main wet gas line to the system when said pressure differential is above said predetermined amount.

5. Apparatus as set forth in claim 4 wherein the device is operable to close each of the valve means individually when said pressure differential reaches said predetermined amount.

6. In a cyclic method of removing a component from a wet gas stream wherein a substantial portion of the wet gas stream is passed through a first drying agent for the component, a hot regenerating fluid is passed through a second drying agent previously loaded with said component, the improved steps comprising:

sensing the pressure of the dry gas downstream of the point of removal of the component therefrom by the agent;

sensing the pressure of the regeneration fluid;

maintaining a preselected pressure differential between the dry gas and the fluid by introducing gas from the wet gas stream into the fluid when said pressure differential exceeds said preselected amount and bleeding fluid to the wet gas stream when the pressure differential falls below said preselected amount.

References Cited by the Examiner

UNITED STATES PATENTS 3,205,639  9/1965  Johnson et al. _____ 55—21

REUBEN FRIEDMAN, *Primary Examiner.*

J. ADEE, *Assistant Examiner.*